US012155521B2

(12) United States Patent
Umehara

(10) Patent No.: US 12,155,521 B2
(45) Date of Patent: Nov. 26, 2024

(54) COMMUNICATION DEVICE, COMMUNICATION METHOD, AND COMPUTER-READABLE STORAGE MEDIUM

(71) Applicant: CANON KABUSHIKI KAISHA, Tokyo (JP)

(72) Inventor: Makoto Umehara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/483,550

(22) Filed: Oct. 10, 2023

(65) Prior Publication Data
US 2024/0048433 A1 Feb. 8, 2024

Related U.S. Application Data

(63) Continuation of application No. 17/409,843, filed on Aug. 24, 2021, now Pat. No. 11,817,991, which is a
(Continued)

(30) Foreign Application Priority Data

Feb. 28, 2019 (JP) ................ 2019-036411

(51) Int. Cl.
H04L 27/34 (2006.01)
H04L 25/03 (2006.01)

(52) U.S. Cl.
CPC .... H04L 27/3483 (2013.01); H04L 25/03006 (2013.01); H04L 2025/03713 (2013.01);
(Continued)

(58) Field of Classification Search
CPC ... H04L 2025/03713; H04L 2025/0377; H04L 2025/03815; H04L 25/03006;
(Continued)

(56) References Cited

U.S. PATENT DOCUMENTS 8,837,516 B2 9/2014 Umehara et al.
2019/0215205 A1 7/2019 Kim
(Continued)

FOREIGN PATENT DOCUMENTS

JP 2018-050133 A 3/2018
WO 2018/048284 A 3/2018
(Continued)

OTHER PUBLICATIONS

International Search Report issued by the Japan Patent Office on Mar. 10, 2020 in corresponding International Application No. PCT/JP2020/004260, with English translation.
(Continued)

Primary Examiner — Nader Bolourchi
(74) Attorney, Agent, or Firm — Carter, DeLuca & Farrell LLP

(57) ABSTRACT

A communication device communicates a physical (PHY) frame including a preamble and a data field. The preamble includes a Legacy Short Training Field (L-STF), a Legacy Long Training Field (L-LTF), a Legacy Signal Field (L-SIG), an EHT Signal Field (EHT-SIG-A), an EHT Short Training Field (EHT-STF), and an EHT Long Training Field (EHT-LTF), and the EHT-SIG-A includes fields indicating a modulation scheme and information indicating which one of a UC (Uniform Constellation) scheme and an NUC (Non Uniform Constellation) scheme is used as the modulation
(Continued)

scheme, and the data field includes data that has undergone modulation corresponding to the modulation scheme and the information indicated by the fields.

16 Claims, 7 Drawing Sheets

Related U.S. Application Data continuation of application No. PCT/JP2020/004260, filed on Feb. 5, 2020.

(52) U.S. Cl.
CPC ............... *H04L 2025/0377* (2013.01); *H04L 2025/03815* (2013.01)

(58) Field of Classification Search
CPC ..... H04L 27/0012; H04L 27/26; H04L 27/34; H04L 27/3483; H04W 72/04; H04W 76/10; H04W 84/12; Y02D 30/70
See application file for complete search history.

(56) References Cited

U.S. PATENT DOCUMENTS

| | | |
|---|---|---|
| 2022/0394115 A1 | 12/2022 | Lee |
| 2022/0394693 A1 | 12/2022 | Umehara |

FOREIGN PATENT DOCUMENTS

| | | |
|---|---|---|
| WO | 2018/108886 A1 | 6/2018 |
| WO | 2018/232138 A1 | 12/2018 |

OTHER PUBLICATIONS

Handte, T. et al., "Signaling and capabilities for non-uniform constellation" IEEE 802.11-17/0057r0 (Jan. 2017) <URL:https://mentor.ieee.org/802.11/dcn/17/11-17-0057-00-00ay-signaling-and-capabilities-for-non-uniform-constellations.pptx> pp. 1-11.

Park, E. S. et al., "Overview of PHY features for Eht" IEEE 802.11-18/1967r1 (Jan. 2019) <URL:https://mentor.ieee.org/802.11/dcn/18/11-18-1967-01-0eht-overview-of-phy-features-for-eht.pptx> pp. 1-22.

Chen, X. G. et al., "Discussions on the PHY features for EHT" IEEE 802.11-18/1461r1 (Sep. 2018) <URL: https://mentor.ieee.org/802.11/dcn/18/11-18-1461-01-0eht-discussions-on-the-phy-features-for-eht.pptx> pp. 1-21.

Y. Ghasempour, C. R. C. M. da Silva, C. Cordeiro and E. W. Knightly, "IEEE 802.11 ay: Next-Generation 60 GHz Communication for 100 GB/s Wi-Fi," in IEEE Communications Magazine, vol. 55, No. 12, pp. 186-192 (Dec. 2017).

Latif, I. et al., " HARQ in EHT" IEEE 802.11-18/2029r1 (Nov. 2018) pp. 1-13.

Notice of Reasons for Refusal issued by the Japanese Patent Office on Apr. 19, 2024 in corresponding JP Patent Application No. 2023-018558 with English translation.

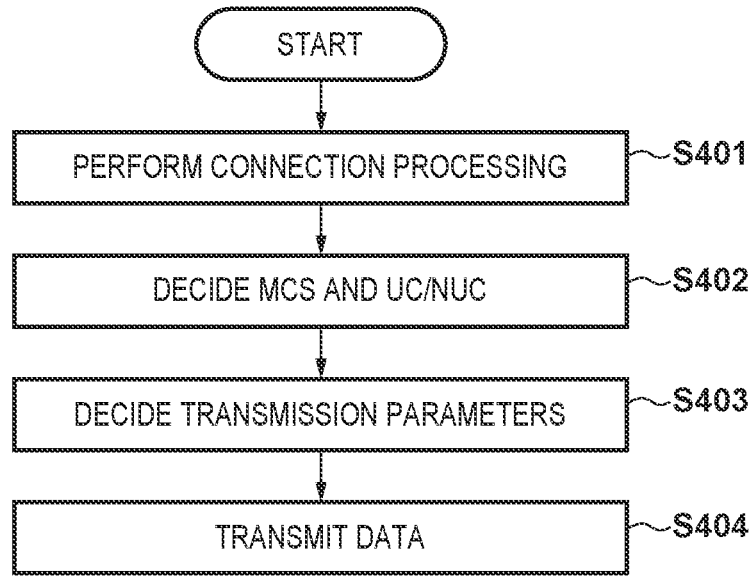
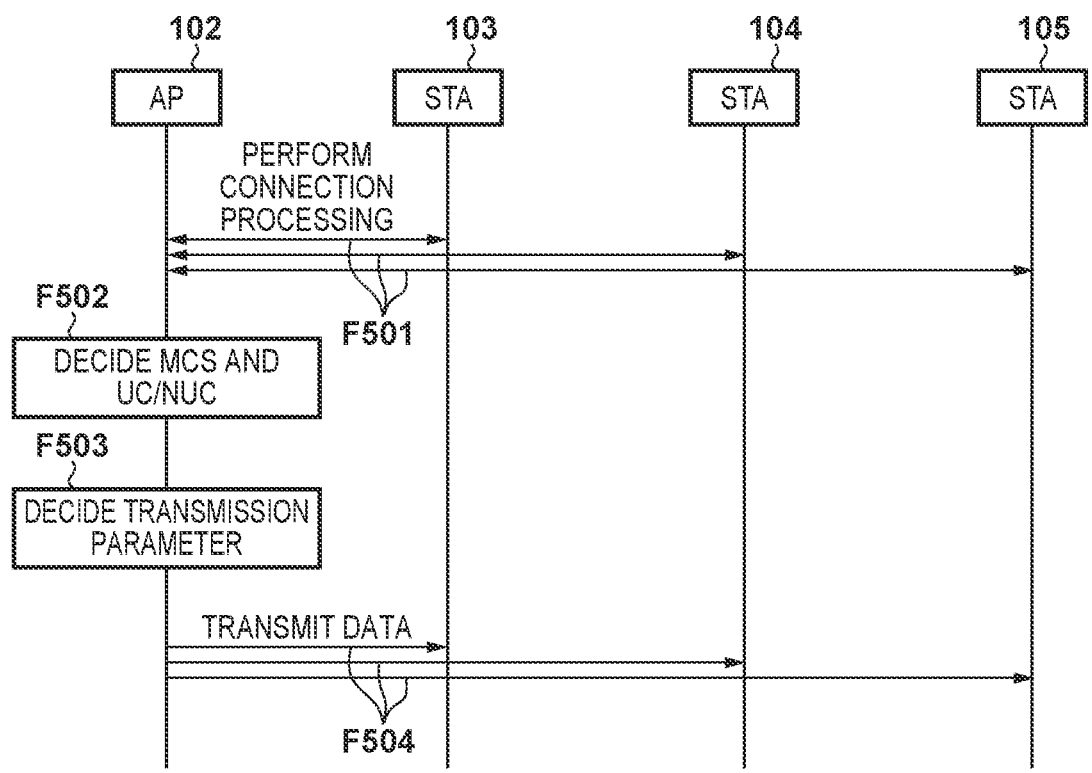

COMMUNICATION DEVICE, COMMUNICATION METHOD, AND COMPUTER-READABLE STORAGE MEDIUM

CROSS-REFERENCE TO RELATED APPLICATIONS

This application is a Continuation of U.S. patent application Ser. No. 17/409,843, filed on Aug. 24, 2021, which is a Continuation of International Patent Application No. PCT/JP2020/004260, filed Feb. 5, 2020, which claims the benefit of Japanese Patent Application No. 2019-036411 filed Feb. 28, 2019, both of which are hereby incorporated by reference herein in their entirety.

BACKGROUND OF THE INVENTION

Field of the Invention

The present invention relates to a communication control technique in a wireless LAN.

Background Art

The Internet usage has recently increased year by year along with the development of information communication technologies, and various communication techniques have been developed to cope with an increase in demand. In particular, wireless local area network (wireless LAN) techniques implement throughput improvement in Internet communications for packet data, audio, video, and the like by wireless LAN terminals, and various technological developments have still been conducted actively.

In the development of wireless LAN techniques, a lot of standardization works by the IEEE (Institute of Electrical and Electronics Engineers) 802, which is a standardization organization for wireless LAN techniques, play an important role. As one of the wireless LAN communication standards, the IEEE802.11 standards are known, including standards such as IEEE802.11n/a/b/g/ac and IEEE802.11ax. For example, IEEE802.11ax implements a high peak throughput of up to 9.6 gigabits per second (Gbps) and additionally improves the communication speed under a congestion situation using OFDMA (Orthogonal frequency-division multiple access) (PTL 1).

Recently, in order to further improve throughput, a task group called EEE802.11be EHT (Extremely High Throughput) has been formed as a successor standard of IEEE802.11ax. As one of measures for throughput improvement that is a target for the EEE802.11be EHT, using, as a modulation scheme when transmitting data, the Non-Uniform Constellation (to be referred to as NUC hereinafter) scheme that is a modulation scheme having a nonuniform constellation point arrangement has been examined. The NUC scheme is a modulation scheme employed in a broadcast standard such as DVB-NGH. DVB-NGH is an abbreviation of Digital Video Broadcasting Next Generation broadcasting system to Handheld.

CITATION LIST

Patent Literature
PTL 1: Japanese Patent Laid-Open No. 2018-50133

In the conventional IEEE802.11 series standards, a Uniform Constellation (to be referred to as UC hereinafter) scheme that is a modulation scheme having a uniform constellation point arrangement is employed. For example, conventionally, 16-QAM (Quadrature Amplitude Modulation) and 64-QAM (UC-N-QAM), in which constellation points are uniformly arranged in a grid pattern, are employed in addition to BPSK and QPSK.

As described above, in IEEE802.11EHT, performing data transmission using 16-QAM or 64-QAM (NUC-N-QAM) as an NUC scheme in addition to a UC scheme has been examined. However, in the conventional standards for a wireless LAN, a mechanism configured to notify which one of a UC scheme and an NUC scheme is to be used as the modulation scheme for data to be transmitted has not been defined.

SUMMARY OF THE INVENTION

The present invention provides a mechanism configured to notify which one of a UC scheme and an NUC scheme is to be used as a modulation scheme for data to be transmitted.

A communication device according to one aspect of the present invention is a communication device that transmits a physical (PHY) frame including a preamble and a data field, wherein the preamble includes: a Legacy Short Training Field (L-STF); a Legacy Long Training Field (L-LTF) arranged immediately after the L-STF in the frame; a Legacy Signal Field (L-SIG) arranged immediately after the L-LTF in the frame; an EHT Signal Field (EHT-SIG-A) arranged after the L-SIG in the frame; an EHT Short Training Field (EHT-STF) arranged immediately after the EHT-SIG-A in the frame; and an EHT Long Training Field (EHT-LTF) arranged immediately after the EHT-STF in the frame, the EHT-SIG-A includes fields indicating a modulation scheme and information indicating which one of a UC (Uniform Constellation) scheme and an NUC (Non Uniform Constellation) scheme is used as the modulation scheme, and the data field includes data that has undergone modulation corresponding to the modulation scheme and the information indicated by the fields.

Further features of the present invention will become apparent from the following description of exemplary embodiments with reference to the attached drawings.

BRIEF DESCRIPTION OF THE DRAWINGS

FIG. 4 is a flowchart showing processing executed by the AP;

FIG. 5 is a sequence chart showing processing executed in a wireless communication network;

DESCRIPTION OF THE EMBODIMENTS

Figure 1:
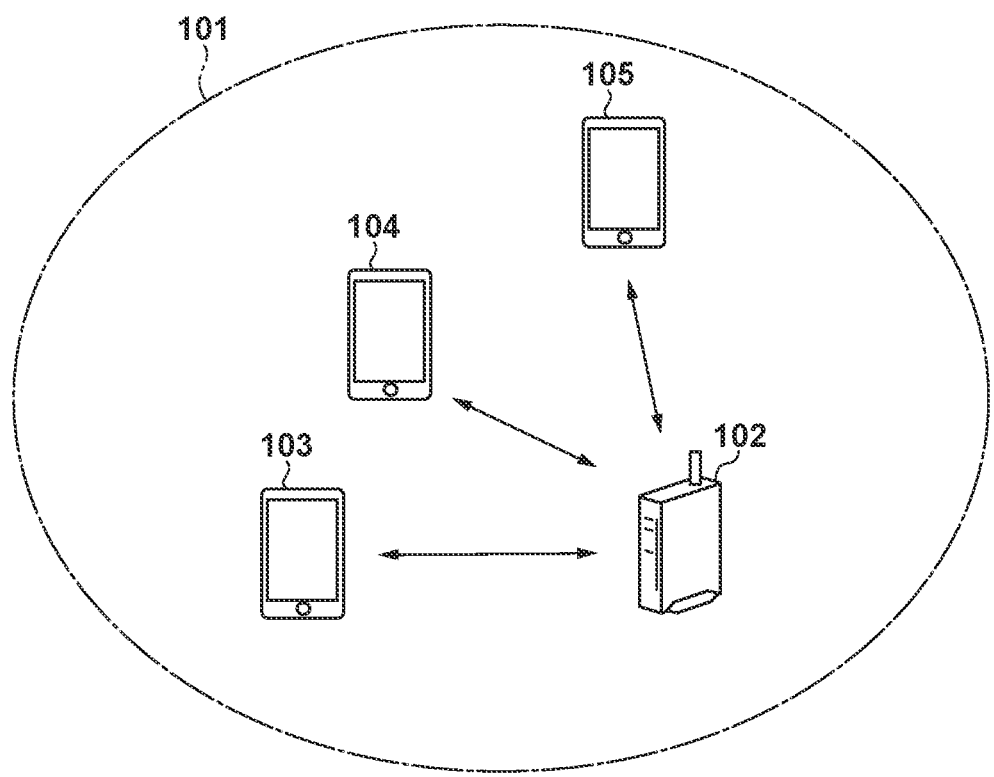
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network is configured to include one access point (AP) 102 and three stations (STAs) (STA 103, STA 104, and STA 105) as devices (EHT devices) complying with the EEE802.11be EHT (Extremely High Throughput) standard. Note that the AP 102 can be considered as one form of an STA because it has the same functions as the STAs 103 to 105 except that it has a relay function. STAs located in a circle 101 representing the area where a signal transmitted from the AP 102 can communicate with the AP 102. The AP 102 communicates with the STAs 103 to 105 in accordance with the wireless communication method of the EEE802.11be EHT standard. The AP 102 can establish a radio link with each of the STAs 103 to 105 via connection processing such as an association process complying with a standard of the IEEE80211 series.

Note that the configuration of the wireless communication network shown in FIG. 1 is merely an example for the description and, for example, a network including many EHT devices and legacy devices (communication devices complying with the IEEE802.11a/b/g/n/ax standards) in a wider area may be formed. Also, the arrangement of the communication devices is not limited to that shown in FIG. 1, and the following argument is applicable to various positional relationships of the communication devices as well. Also, it may be understood that EHT is an acronym of Extreme High Throughput.

(Configuration of AP)

Figure 2:
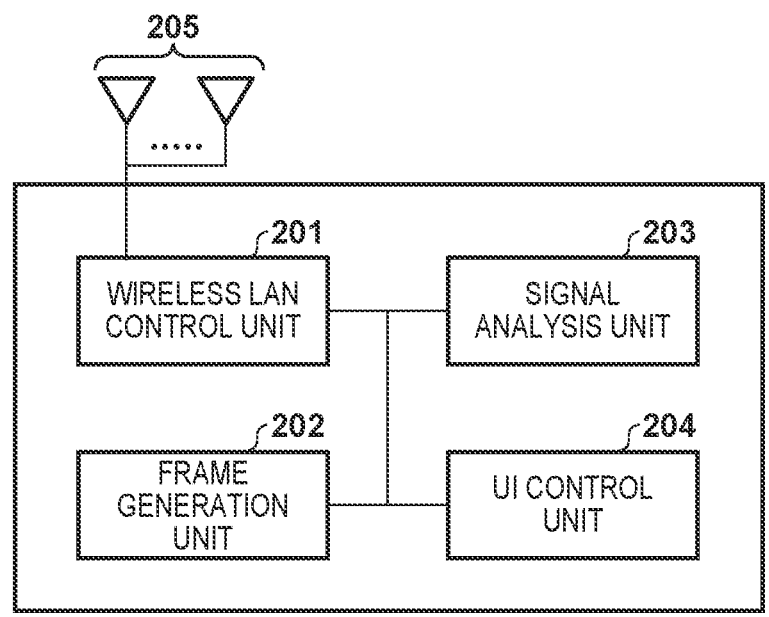
FIG. 2 is a block diagram showing an example of the functional configuration of an AP.

FIG. 2 is a block diagram showing the functional configuration of the AP 102. The AP 102 includes, as an example of its functional configuration, a wireless LAN control unit 201, a frame generation unit 202, a signal analysis unit 203, and a UI (User Interface) control unit 204.

The wireless LAN control unit 201 can be configured to include one or more antennas 205 and circuits configured to transmit/receive a radio signal (radio frame) to/from another wireless LAN device, and a program configured to control these. The wireless LAN control unit 201 executes communication control of the wireless LAN based on a frame generated by the frame generation unit 202 in accordance with the standard of the IEEE802.11 series.

The frame generation unit 202 generates a frame to be transmitted by the wireless LAN control unit 201 based on the result of analysis performed by the signal analysis unit 203 for a signal received by the wireless LAN control unit 201. The frame generation unit 202 may create a frame without depending on the analysis result of the signal analysis unit 203. The signal analysis unit 203 analyzes a signal received by the wireless LAN control unit 201. The UI control unit 204 accepts an operation by the user (not shown) of the AP 102 on an input unit 304 (FIG. 3), and performs control of transmitting a control signal corresponding to the operation to each constituent element or controls output (including display and the like) for an output unit 305 (FIG. 3).

Figure 3:
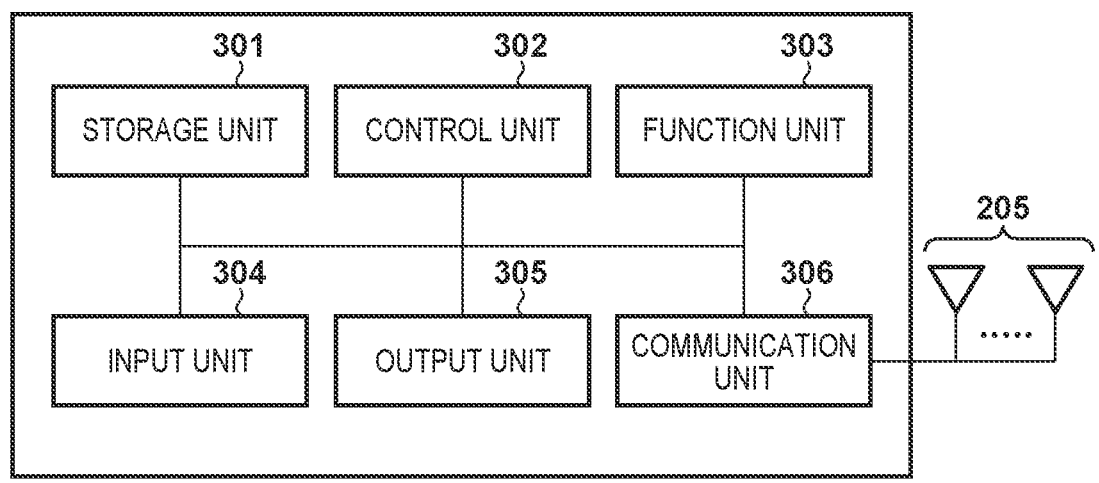
FIG. 3 is a block diagram showing an example of the hardware configuration of the AP.

FIG. 3 shows the hardware configuration of the AP 102 according to this embodiment. The AP 102 includes, as an example of its hardware configuration, a storage unit 301, a control unit 302, a function unit 303, the input unit 304, the output unit 305, a communication unit 306, and the one or more antennas 205.

The storage unit 301 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 301.

The control unit 302 is formed by, for example, a processor such as a CPU or an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 302 executes the programs stored in the storage unit 301, thereby controlling the entire AP 102. Note that the control unit 302 may control the entire AP 102 by cooperation of the programs stored in the storage unit 301 and an OS (Operating System).

In addition, the control unit 302 controls the function unit 303 to execute predetermined processing such as image capturing, printing, or projection. The function unit 303 is hardware used by the AP 102 to execute predetermined processing. For example, if the AP 102 is a camera, the function unit 303 is an image capturing unit and performs image capturing processing. For example, if the AP 102 is a printer, the function unit 303 is a printing unit and performs print processing. For example, if the AP 102 is a projector, the function unit 303 is a projection unit and performs projection processing. Data to be processed by the function unit 303 may be data stored in the storage unit 301, or may be data communicated with an STA or another AP via the communication unit 306 to be described later.

The input unit 304 accepts various kinds of operations from a user. The output unit 305 performs various kinds of outputs for the user. Here, the output by the output unit 305 includes at least one of display on a screen, audio output by a loudspeaker, vibration output, and the like. Note that both the input unit 304 and the output unit 305 may be implemented by one module, like a touch panel.

The communication unit 306 controls wireless communication complying with the EEE802.11be EHT standard, or controls wireless communication complying with Wi-Fi or IP (Internet Protocol) communication (including modulation and encoding processing). Also, the communication unit 306 controls the one or more antennas 205 to transmit/receive radio signals for wireless communication. In this case, MIMO (Multi Input Multi Output) communication using spatial streams is possible. The AP 102 communicates contents such as image data, document data, and video data with another communication device via the communication unit 306. Note that the functions of the constituent elements shown in FIG. 3 may partially be implemented by software.

(Configuration of STA)

The functional configuration and the hardware configuration of the STAs 103 to 105 are the same as the functional configuration (FIG. 2) and the hardware configuration (FIG. 3) of the AP 102 described above, respectively. That is, each of the STAs 103 to 105 can be configured to include, as its functional configuration, the wireless LAN control unit 201, the frame generation unit 202, the signal analysis unit 203, and the UI control unit 204 and include, as its hardware configuration, the storage unit 301, the control unit 302, the function unit 303, the input unit 304, the output unit 305, the communication unit 306, and the one or more antennas 205.

(Procedure of Processing)

Next, the procedure of processing executed by the AP 102 configured as described above and the sequence of processing executed by the wireless communication system shown in FIG. 1 will be described with reference to FIGS. 4 and 5. FIG. 4 is a flowchart showing processing executed by the AP 102. The flowchart shown in FIG. 4 can be implemented when the control unit 302 of the AP 102 executes a control program stored in the storage unit 301 and executes calculation and processing of information and control of each hardware. FIG. 5 shows a sequence chart of processing executed by the wireless communication system.

The AP 102 performs connection processing complying with the standard of the IEEE802.11 series for each of the STAs 103 to 105 (step S401, F501). That is, frames such as Probe Request/Response, Association Request/Response, and Auth (authentication) are transmitted/received between the AP 102 and each of the STAs 104 and 105, thereby establishing a radio link.

Next, the AP 102 decides a modulation scheme and a coding rate to be used for wireless communication as a value (level) of MCS (Modulation and Coding Scheme) (step S402, F502). The MCS shows a combination of a modulation scheme and a coding rate as an index. The relationship between the value of MCS used in this embodiment and a modulation scheme and a coding rate corresponding to the value of MCS will be described later with reference to Table 3 and Table 4. The value of MCS can be decided by the signal analysis unit 203 based on the reception state in the AP 102. For example, the value of MCS can be decided based on the quality and strength (SNR (Signal-to-Noise Ratio), SINR (Signal-to-Interference Noise Ratio), RSSI (Received Signal Strength Indicator), RSSQ (Received Signal Strength Quality)) and the like of signals received from each STA. Also, the value of MCS may be set in advance in the wireless communication system. The value of MCS may be decided by an operation of a user (not shown) of the AP 102 on the input unit 304. As described above, the method of deciding the value of MCS is not limited to a specified method.

Also, the AP 102 decides, as UC/NUC information, which one of a UC scheme and an NUC scheme is to be used as the constellation point arrangement of the modulation scheme to be used for wireless communication (step S402, F502). The decision of the UC/NUC information is performed based on the reception environment between the AP 102 and each STA, an operation input by the user, and the like, like the decision of the value of MCS, and is not limited to a specified method. Also, as will be described later using Table 4, if the value of MCS corresponds to the combination of a modulation scheme, a coding rate, and UC/NUC information the AP 102 may decide the modulation scheme, the coding rate, and the UC/NUC information to be used for wireless communication as the value (level) of MCS. The information of the constellation point arrangement of a UC scheme or an NUC scheme corresponding to each modulation scheme is shared by the AP and the STAs.

Figure 9:
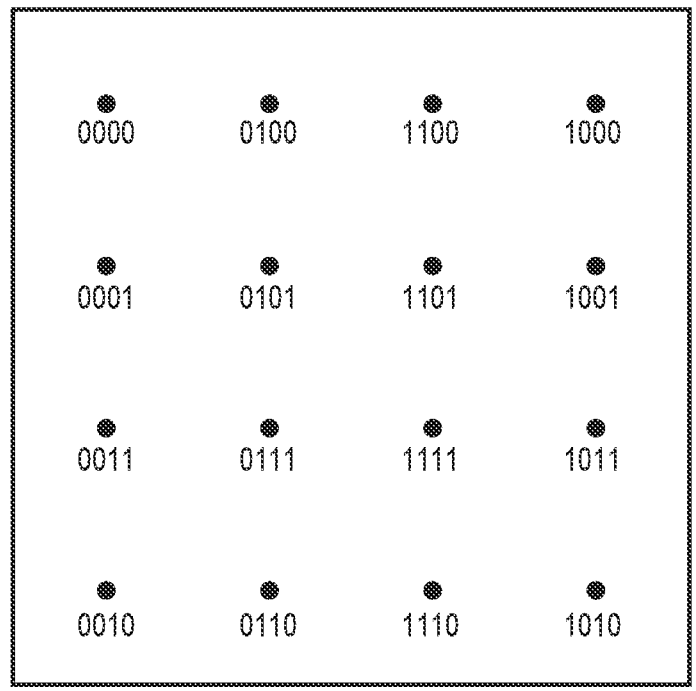
FIG. 9 is a view showing an example of the constellation point arrangement of UC-16-QAM.
Figure 10:
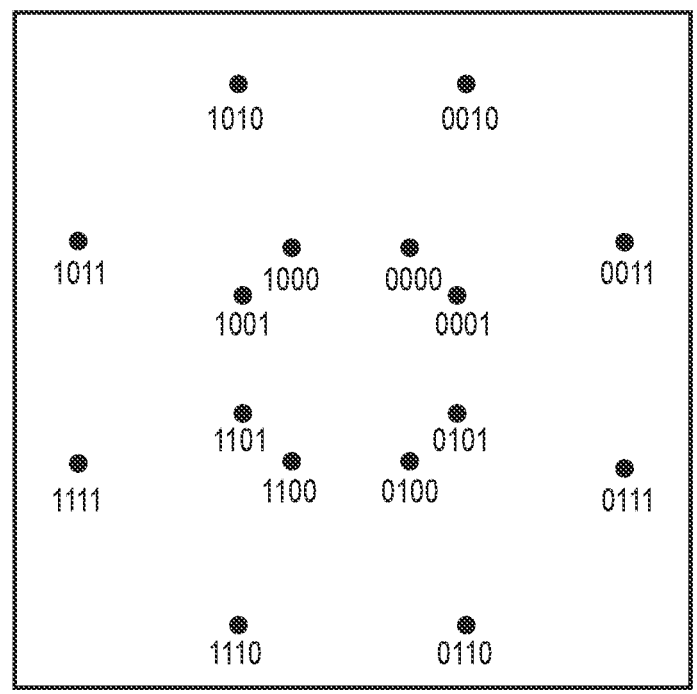
FIG. 10 is a view showing an example of the constellation point arrangement of NUC-16-QAM.

Examples of the constellation point arrangements of a UC scheme and an NUC scheme for 16QAM will be described here with reference to FIGS. 9 and 10. FIGS. 9 and 10 show examples of the constellation point arrangements of UC-16-QAM and NUC-16-QAM, respectively. In the example of the constellation point arrangement of UC-16-QAM shown in FIG. 9, constellation points are uniformly arranged in a grid pattern. On the other hand, in the example of the constellation point arrangement of NUC-16-QAM shown in FIG. 10, each constellation point is specified with respect to the center point on a polar coordinate system. A constellation point arranged far apart from the center point is readily affected by phase noise. However, in the UC-16-QAM shown in FIG. 10, a constellation point arranged far apart from the center point is distant from each adjacent constellation point, and the influence of phase noise can be mitigated. Note that the constellation point arrangement of the NUC scheme shown in FIG. 10 is merely an example, and all schemes having a nonuniform constellation point arrangement can be included in the NUC scheme.

Referring back to FIGS. 4 and 5, next, the AP 102 decides communication parameters including the MCS and the UC/NUC information decided in step S402 or F502, which are included in a radio frame to be transmitted (step S403, F503). Next, the AP 102 transmits data in a form of a radio frame including the decided transmission data communication parameters and data to the STAs 103 to 105 (step S404, F504).

(Frame Structure)

Figure 6:
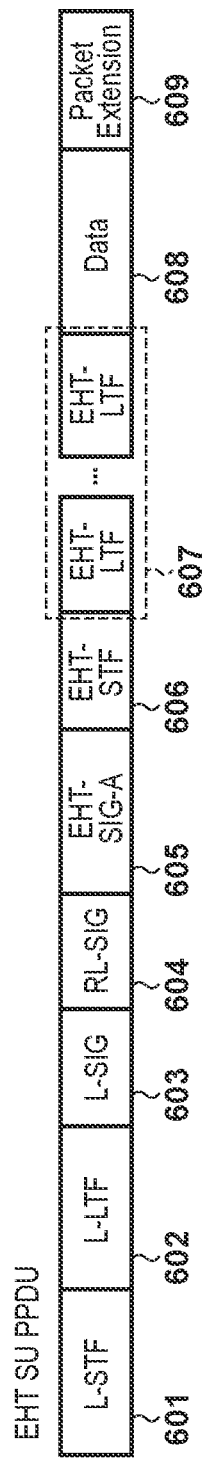
FIG. 6 is a view showing an example of the PHY frame structure of an EHT SU PPDU.
Figure 7:
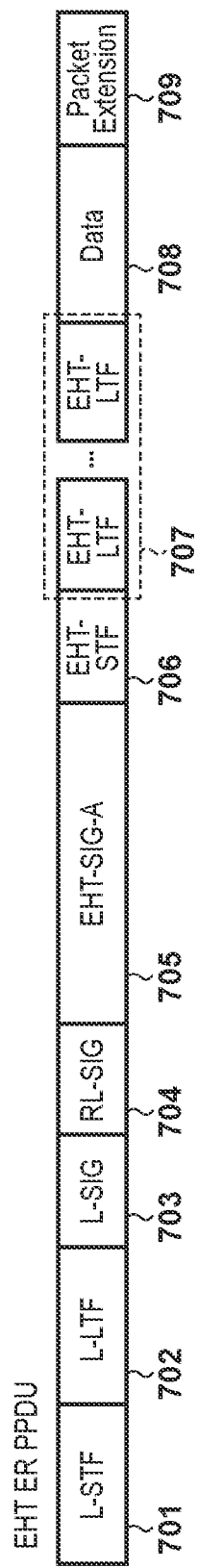
FIG. 7 is a view showing an example of the PHY frame structure of an EHT ER PPDU.
Figure 8:
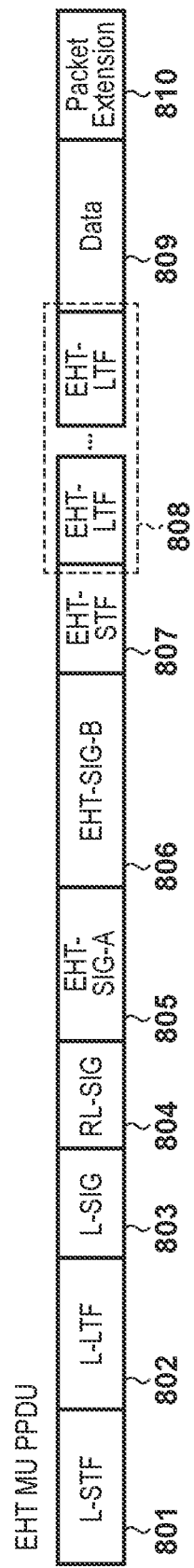
FIG. 8 is a view showing an example of the PHY frame structure of an EHT MU PPDU.

FIGS. 6 to 8 show examples of PHY (physical) frame structures of PPDUs defined by the EEE802.11be EHT standard and transmitted in step S404 or F504. Note that PPDU is an abbreviation of Physical Layer (PHY) Protocol Data Unit. FIG. 6 shows an example of the PHY frame structure of an EHT SU PPDU that is a PPDU for single-user (SU) communication (between an AP and a single STA). FIG. 7 shows an example of the PHY frame structure of an EHT ER PPDU that is a PPDU for communication in an extended area (communication distance) (Extended Range). The EHT ER PPDU is used in communication between an AP and a single STA. FIG. 8 shows an example of the PHY frame structure of an EHT MU PPDU that is a PPDU for multi-user (MU) communication (between an AP and a plurality of STAs).

Pieces of information commonly included in the PPDUs shown FIGS. 6 to 8 are an STF (Short Training Field), an LTF (Long Term Field), and an SIG (Signal Field). Taking FIG. 6 as an example, the PPDU head portion includes an L (Legacy)-STF 601, an L-LTF 602, and an L-SIG 603 having backward compatibility with the IEEE802.11a/b/g/n/ax standards. The L-STF 601 is used for detection of a PHY frame signal, automatic gain control (AGC), timing detection, or the like. The L-LTF 602 arranged immediately after the L-STF 601 is used for highly accurate frequency/time synchronization, obtainment of propagation channel information (CSI), or the like. The L-SIG 603 arranged immediately after the L-LTF 602 is used for transmitting control information including information such as a data transmission rate and a PHY frame length. A legacy device complying with the IEEE802.11a/b/g/n/ax standards can decode data of the above-described various kinds of legacy fields (the L-STF 601, the L-LTF 602, and the L-SIG 603). The various kinds of legacy fields are similarly included in the PPDUs shown in FIGS. 7 and 8 as well.

Next to the L-STF 601, the L-LTF 602, and the L-SIG 603 described above, the EHT SU PPDU shown in FIG. 6 includes a repeated legacy signal field (RL-SIG) 604, an EHT-SIG-A 605, an EHT-STF 606, an EHT-LTF 607, a data field 608, and a Packet extension 609. The RL-SIG 604 may be absent. The EHT-SIG-A 605 is arranged after the L-SIG 603, the EHT-STF 606 is arranged immediately after the EHT-SIG-A 605, and the EHT-LTF 607 is arranged immediately after the EHT-STF 606. Note that the field including the L-STF 601, the L-LTF 602, the L-SIG 603, the RL-SIG 604, the EHT-SIG-A 605, the EHT-STF 606, and the EHT-LTF 607 is called a preamble. The EHT-SIG-A 605 includes Information such as EHT-SIG-A1 and EHT-SIG-A2 necessary for reception of the PPDU. Subfields that form the EHT-SIG-A1 and the EHT-SIG-A2 included in the EHT-SIG-A 605 and a description thereof are shown in Table 1 and Table 2.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_FLAG. |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | UC/NUC | 1 | This subfield indicates which of a UC scheme and an NUC scheme is applied to the data field. If the UC scheme is applied, "0" is set. If the NUC scheme is applied, "1" is set. |
| | B8 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied, "0" is set. |
| | B9-B14 | BSS Color | 6 | 6-bit number for identifying the BSS |
| | B15-B18 | Spatial Reuse | 4 | This subfield indicates whether Spatial Reuse is allowed during transmission of this PPDU. The value of Spatial Reuse field encoding shown in the separate table is set. |
| | B19-B20 | Bandwidth | 2 | In a case of an EHT SU PPDU: "0" is set for 20 MHz, "1" is set for 40 MHZ, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| | B21-B22 | GI + LTF Size | 2 | This subfield indicates the Guard Interval period and the EHT-LTF size. "0" is set for 1 × EHT-LTF and 0.8 µs GI, "1" is set for 2 × EHT-LTF and 0.8 µs GI, "2" is set for 2 × EHT-LTF and 1.6 µs GI, "3" is set if both the DCM and STBC fields are "1" and for 4 × EHT-LTF and 0.8 µs GI, or "3" is set for 4 × EHT-LTF other than the above case and 3.2 µs GI. |
| | B23-B25 | NSTS And Midamble Periodicity | 2 | This subfield indicates the number of space-time streams and the midamble period for frame synchronization. |

TABLE 1-continued

| Bit Position | Subfield | Bit Count | Description |
|---|---|---|---|
| | | | If the Doppler field is "0", "(the number of space-time streams) – 1" is set. If the Doppler field is "1", B23 and B24 indicate the number of space-time streams. B25 is "0" if the midamble period is 10, or "1" if the midamble period is 20. |

TABLE 2

| Bit Position | Subfield | Bit Count | Description |
|---|---|---|---|
| EHT-SIG-A2 B0-B6 | TXOP | 1 | Transmission Opportunity. If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION – 512)/8 is set in B1 to B6 |
| B7 | Coding | 1 | "0" is set for BCC (Binary Convolutional Code), or "1" is set for LDPC (Low Density Parity Check). |
| B8 | LDPC Extra Symbol Segment | 1 | This subfield indicates the presence/absence of an extra OFDM symbol segment for LDPC. |
| B9 | STBC | 1 | "1" is set in this field if STBC (Space-Time Block Coding) is used and the DCM subfield is "0", "1" is also set if neither DCM nor STBC is applied, or "0" is set otherwise. |
| B10 | Beamformed | 1 | "1" is set if beamforming steering is applied to the waveform of SU transmission. |
| B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B13 | PE Disambiguity | 1 | Disambiguity field of Packet Extension |
| B14 | Reserved | 1 | Reserved field |
| B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

In this embodiment, fields indicating the modulation scheme and the UC/NUC information indicating which one of the UC scheme and the NUC scheme is used as the modulation scheme are included in the EHT-SIG-A1. For example, the MCS decided in step S402 or F502 is indicated by 4 bits of the MCS subfield (B3-B3) in the EHT-SIG-A1 (Table 1). Also, the UC/NUC information can be designated in the EHT-SIG-A1, and indicated by 1 bit of the UC/NUC subfield (B7) in Table 1 (as an example, 0 is set for the UC scheme, and 1 is set for the NUC scheme). An example of the correspondence between a value of MCS shown in the MCS subfield and a modulation scheme and a coding rate corresponding to the value of MCS is shown in Table 3. In Table 3, the MCS has values from 0 to 11, and the information of a modulation scheme and a coding rate is set in correspondence with each value of MCS. For example, if UC-16-QAM as shown in FIG. 9 is used, 3 or 4 is designated as the value of MCS in the MCS subfield, and 0 is designated in the UC/NUC subfield.

TABLE 3

| MCS | Modulation Scheme | Coding Rate |
|---|---|---|
| 0 | BPSK | 1/2 |
| 1 | QPSK | 1/2 |
| 2 | QPSK | 3/4 |
| 3 | 16QAM | 1/2 |
| 4 | 16QAM | 3/4 |
| 5 | 64QAM | 2/4 |
| 6 | 64QAM | 3/4 |
| 7 | 64QAM | 5/6 |
| 8 | 256QAM | 3/4 |
| 9 | 256QAM | 5/6 |
| 10 | 1024QAM | 3/4 |
| 11 | 1024QAM | 5/6 |

Note that the means for notifying the UC/NUC information is not limited to this. For example, an MCS including UC/NUC information in addition to a modulation scheme and a coding rate may be defined such that the UC/NUC information is indicated by a plurality of bits in association with the modulation scheme. Table 4 shows an example of the correspondence between a value of MCS, and a modulation scheme, a coding rate, and UC/NUC information corresponding to the value of MCS. If a table of values of MCS including UC/NUC information, as shown in Table 4, is used, the bit count of the MCS subfield needed to express all MCSs may be insufficient. In this case, not less than 5 bits may be allocated to the MCS subfield.

TABLE 4

| MCS | Modulation Scheme | Coding Rate | UC/NUC |
|---|---|---|---|
| 0 | BPSK | 1/2 | UC |
| 1 | QPSK | 1/2 | UC |
| 2 | QPSK | 3/4 | UC |
| 3 | 16QAM | 1/2 | UC |
| 4 | 16QAM | 3/4 | UC |
| 5 | 64QAM | 2/4 | UC |
| 6 | 64QAM | 3/4 | UC |
| 7 | 64QAM | 5/6 | UC |
| 8 | 256QAM | 3/4 | UC |
| 9 | 256QAM | 5/6 | UC |
| 10 | 1024QAM | 3/4 | UC |
| 11 | 1024QAM | 5/6 | UC |
| 12 | BPSK | 1/2 | NUC |
| 13 | QPSK | 1/2 | NUC |
| 14 | QPSK | 3/4 | NUC |
| 15 | 16QAM | 1/2 | NUC |
| 16 | 16QAM | 3/4 | NUC |
| 17 | 64QAM | 2/4 | NUC |
| 18 | 64QAM | 3/4 | NUC |
| 19 | 64QAM | 5/6 | NUC |
| 20 | 256QAM | 3/4 | NUC |
| 21 | 256QAM | 5/6 | NUC |
| 22 | 1024QAM | 3/4 | NUC |
| 23 | 1024QAM | 5/6 | NUC |

The EHT-STF 606 next to the EHT-SIG-A 605 is an abbreviation of EHT Short Training Field, and its main object is to improve automatic gain control in MIMO transmission. The EHT-LTF 607 is an abbreviation of EHT Long Training Field and provides a means for estimating a MIMO channel to a receiver. The data field 608 includes data modulated in accordance with the modulation scheme and the UC/NUC information indicated in the above-described EHT-SIG-A1. The communication device (AP) on the transmitting side modulates and encodes the data in the data field 608, stores the information of the MCS (value (level) of MCS) and the UC/NUC information used for the modulation and encoding in the EHT-SIG-A1, and transmits the PPDU to the communication device (STA) on the receiving side. The communication device on the receiving side can demodulate and decode the received data in the data field based on the information of the MCS and the UC/NUC information in the EHT-SIG-A1 of the received PPDU.

The EHT ER PPDU shown in FIG. 7 is a PPDU used to extend the communication distance, as described above, and is used in communication between an AP and a single STA. The EHT ER PPDU includes an L-STF 701, an L-LTF 702, an L-SIG 703, an RL-SIG 704, an EHT-SIG-A 705, an EHT-STF 706, an EHT-LTF 707, a data field 708, and a Packet extension 709. The RL-SIG 704 may be absent. The L-LTF 702 is arranged immediately after the L-STF 701, the L-SIG 703 is arranged immediately after the L-LTF 702, the EHT-SIG-A 705 is arranged after the L-SIG 703, the EHT-STF 706 is arranged immediately after the EHT-SIG-A 705, and the EHT-LTF 707 is arranged immediately after the EHT-STF 706. Note that the field including the L-STF 701, the L-LTF 702, the L-SIG 703, the RL-SIG 704, the EHT-SIG-A 705, the EHT-STF 706, and the EHT-LTF 707 is called a preamble. Information included in each field has the same contents as in the EHT SU PPDU shown in FIG. 6, and a description thereof will be omitted. Note that in the EHT-SIG-A 705, whether to use the UC scheme or the NUC scheme as the constellation point arrangement can be set in the UC/NUC subfield of the EHT-SIG-A1, like the EHT SU PPDU shown in FIG. 6.

The EHT MU PPDU shown in FIG. 8 is a PPDU used in communication of MU, as described above. The EHT MU PPDU includes an L-STF 801, an L-LTF 802, an L-SIG 803, an RL-SIG 804, an EHT-SIG-A 805, an EHT-SIG-B 806, an EHT-STF 807, an EHT-LTF 808, a data field 809, and a Packet extension 810. The RL-SIG 804 may be absent. The L-LTF 802 is arranged immediately after the L-STF 801, the L-SIG 803 is arranged immediately after the L-LTF 802, the EHT-SIG-A 805 is arranged after the L-SIG 803, the EHT-SIG-B 806 is arranged immediately after the EHT-SIG-A 805, the EHT-STF 807 is arranged immediately after the EHT-SIG-B 806, and the EHT-LTF 808 is arranged immediately after the EHT-STF 807. Note that the field including the L-STF 801, the L-LTF 802, the L-SIG 803, the RL-SIG 804, the EHT-SIG-A 805, the EHT-SIG-B 806, the EHT-STF 807, and the EHT-LTF 808 is called a preamble. In the data field 809, data for a plurality of STAs (users) is transmitted by MIMO or OFDMA (Orthogonal Frequency-Division Multiple Access).

The EHT-SIG-A 805 includes Information such as EHT-SIG-A1 and EHT-SIG-A2 necessary for reception of the PPDU. Subfields that form the EHT-SIG-A1 and the EHT-SIG-A2 included in the EHT-SIG-A 805 and a description thereof are shown in Table 5 and Table 6.

TABLE 5

| Bit Position | Subfield | Bit Count | Description |
|---|---|---|---|
| EHT-SIG-A1 B0 | UL/DL | 1 | This subfield indicates whether the PPDU is for UL or DL, and has the same value as TXVECTOR UPLINK_FLAG. |
| B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| B4 | SIGB DCM | 1 | "1" is set if the HT-SIG-B field is modulated using DCM. |
| B5-B10 | BSS Color | 6 | 6-bit number for identifying the BSS |
| B11-B14 | Spatial Reuse | 4 | This subfield indicates whether Spatial Reuse is allowed during transmission of this PPDU. The value of Spatial Reuse field encoding shown in the separate table is set. |
| B15-B17 | Bandwidth | 3 | "0" is set for 20 MHz, "1" is set for 40 MHZ, or "3" is set for 160 MHz (80 + 80 MHz). When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing, "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |
| B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B22 | SIG Compression | 1 | "1" is set if a Common field exists in the EHT-SIG-B. |
| B23-B24 | Gi + LTF Size | 2 | This subfield indicates the Guard Interval period and the EHT-LTF size. "0" is set for 4 × EHT-LTF and 0.8 μs GI, "1" is set for 2 × EHT-LTF and 0.8 μs GI, "2" is set for 2 × EHT-LTF and 1.6 μs GI, or "3" is for 4 × EHT-LTF and 3.2 μs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 6

| Bit Position | Subfield | Bit Count | Description |
| --- | --- | --- | --- |
| EHT-SIG-A2 B0-B6 | TXOP | 1 | Transmission Opportunity<br>If TXOP_DURATION of TXVECTOR is UNSPECIFIED and there is no period information, 127 is set.<br>If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| B7 | Reserved | 1 | Reserved field |
| B8-B10 | Number of EHT-LTF Symbols And Midamble Periodicity | 3 | This subfield indicates the number of EHT-LTFs.<br>"0" is set for one EHT-LTF, "1" is set for two EHT-LTFs, "2" is set for four EHT-LTFs, "3" is set for six EHT-LTFs, or "4" is set for eight EHT-LTFs.<br>When the Doppler field is "1", B8 and B9 indicate the number of EHT-LTF symbols, and B10 indicates the midamble period. |
| B11 | LDPC Extra Symbol Segment | 1 | This subfield indicates the presence/absence of an extra OFDM symbol segment for LDPC. |
| B12 | STBC | 1 | When the number of users of each RU (Resource Unit) is not larger than 1, "1" is set to indicate that STBC is used for encoding. |
| B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B15 | PE Disambiguity | 1 | Disambiguity field of Packet Extension |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

The EHT-SIG-B 806 includes information such as Common field and User Block field necessary for reception of the PPDU. Subfields that form the Common field and the User Block field included in the EHT-SIG-B 806 and a description thereof are shown in Table 7 and Table 8.

TABLE 7

| | Subfield | Bit Count | Description |
| --- | --- | --- | --- |
| Common field | RU Allocation | N × 8 | This subfield indicates RU allocation used in the data portion of a frequency axis<br>When N = 1, EHT MU PPDUs of 20 MHz and 40 MHz are allocated.<br>When N = 2, an EHT MU PPDU of 80 MHz is allocated.<br>When N = 4, an EHT MU PPDU of 160 MHz or 80 + 80 MHz is allocated. |
| | Center 26-tone RU | 1 | This subfield is used only when the Bandwidth field of EHT-SIG-A field of an EHT MU PPDU is larger than 1 (if the frequency is equal to or higher than 80 MHz). This subfield indicates whether to use a 26-tone RU at the center. |
| | CRC | 4 | CRC calculation value |
| | Tail | 6 | Trailer bit, which is set to 0. |

TABLE 8

| | Subfield | Bit Count | Description |
| --- | --- | --- | --- |
| User Block field | User field | N × 21 | This subfield indicates information for each user. |
| | CRC | 4 | CRC calculation value |
| | Tail | 6 | Trailer bit, which is set to 0. |

The EHT-SIG-B 806 includes Common field that is information common of all STAs (users) and User Block fields as many as the STAs to communicate. Also, the contents of the User field in the User Block field change depending on whether the AP performs MIMO communication. Table 9 shows a description of the User field in a case of Non-MIMO communication, and Table 10 shows a description of the User field in a case of MU-MIMO communication.

TABLE 9

| | Subfield | Bit Count | Description |
| --- | --- | --- | --- |
| User field | STA-ID | 11 | This subfield indicates the ID of an STA or an STA group that is the receiver of the RU of an HE MU PPDU |
| | NSTS | 3 | This subfield indicates the number of Space-time streams |

TABLE 9-continued

| Subfield | Bit Count | Description |
|---|---|---|
| Tx Beamforming | 1 | When transmission Beamforming is used, "1" is set. When transmission Beamforming is not used, "0" is set. |
| MCS | 4 | This subfield indicates the value of Modulation and Coding Scheme |
| UC/NUC | 1 | "0" is set if the UC scheme is applied. "1" is set if the NUC scheme is applied. |
| DCM | 1 | This subfield indicates whether Dual Carrier Modulation is applied to the data field. |
| Coding | 1 | When BCC (Binary Convolutional Code) is used, "0" is set. When LDPC (Low Density Parity Check) is used, "1" is set. |

TABLE 10

| | Subfield | Bit Count | Description |
|---|---|---|---|
| User field | STA-ID | 11 | This subfield indicates the ID of an STA or an STA group that is the receiver of the RU of an HE MU PPDU |
| | Spatial Configuration | 4 | This subfield indicates the number of Spatial Streams of an STA in MU-MIMO Allocation |
| | MCS | 4 | This subfield indicates the value of Modulation and Coding Scheme |
| | UC/NUC | 1 | "0" is set if the UC scheme is applied. "1" is set if the NUC scheme is applied. |
| | Reserved | 1 | Reserved field |
| | Coding | 1 | When BCC (Binary Convolutional Code) is used, "0" is set. When LDPC (Low Density Parity Check) is used, "1" is set. |

In this embodiment, the fields indicating the modulation scheme and the UC/NUC information indicating which one of the UC scheme and the NUC scheme is used as the modulation scheme are included in the EHT-SIG-B. For example, in Table 9 and Table 10, the modulation scheme and the coding rate (that is, the value (level) of MCS) used for modulation and encoding processing of the data in the data field for each STA are indicated by the 4-bit MCS subfield. An example of the correspondence between a value of MCS shown in the MCS subfield and a modulation scheme and a coding rate corresponding to the value of MCS is the same as that shown in Table 3. Also, in Table 8 and Table 9, the UC/NUC information indicating which one of the UC scheme and the NUC scheme is used as the modulation scheme is indicated by the 1-bit UC/NUC subfield. As in Table 2, for example, the UC/NUC information is indicated by 0 for the UC scheme and 1 for the NUC scheme. Also, as in Table 4, a subfield for designating an MCS defined including a modulation scheme, a coding rate, and UC/NUC information may be prepared.

When the frame structures of the EHT SU PPDU, the EHT ER PPDU, and the EHT MU PPDU, which are PPDUs used in the EEE802.11be EHT standard shown in the present invention, are used in the above-described way, it is possible to notify that data transmission using the NUC scheme in addition to the UC scheme is performed.

Note that FIG. 6 shows a frame structure having backward compatibility with the IEEE802.11a/b/g/n/ax standards. If backward compatibility need not be ensured, the fields of the L-STF and the L-LTF may be omitted. Instead, the EHT-STF and the EHT-LTF may be inserted.

According to the present invention, it is possible to notify which one of a UC scheme and an NUC scheme is to be used as a modulation scheme for data to be transmitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device, comprising:
at least one memory that stores a set of instructions; and
at least one processing circuit,
wherein the communication device is caused, by the at least one processing circuit executing the set of instructions to perform operations comprising:

generating a physical (PHY) frame including a preamble and a data field; and transmitting the generated PHY frame, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, and the data field includes data that has undergone modulation corresponding to the information indicated in the second field.

2. The communication device according to claim 1, wherein the communication device determines, based on reception status of signals from another communication device that receives the PHY frame, to include the information indicating which one of the UC scheme and the NUC scheme is used as the modulation scheme into the second field.

3. The communication device according to claim 1, wherein the communication device determines, based on Signal-to-Noise Ratio (SNR) or Signal-to-Interference Noise Ratio (SINR) or Received Signal Strength Indicator (RSSI) or Received Signal Strength Quality (RSSQ) of a signal received from another communication device, to include the information indicating which one of the UC scheme and the NUC scheme is used as the modulation scheme into the second field.

4. The communication device according to claim 1, wherein information indicating which one of the UC scheme and the NUC scheme is used as the modulation scheme is indicated by 1 bit.

5. The communication device according to claim 1, wherein information indicating which one of the UC scheme and the NUC scheme is used as the modulation scheme is indicated by a plurality of bits in association with the modulation scheme.

6. A communication device, comprising:

at least one memory that stores a set of instructions; and at least one processing circuit, wherein the communication device is caused, by the at least one processing circuit executing the set of instructions to perform operations comprising:

receiving a physical (PHY) frame including a preamble and a data field; and processing the received data field, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, the data field includes data that has undergone modulation corresponding to the information indicated in the second field, the communication device processes the data field, based on the information indicated in the second field.

7. The communication device according to claim 6, wherein information indicating which one of the UC scheme and the NUC scheme is used as the modulation scheme is indicated by 1 bit.

8. The communication device according to claim 6, wherein information indicating which one of the UC scheme and the NUC scheme is used as the modulation scheme is indicated by a plurality of bits in association with the modulation scheme.

9. A communication method, comprising:

generating a physical (PHY) frame including a preamble and a data field; and transmitting the generated PHY frame, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, and the data field includes data that has undergone modulation corresponding to the information indicated in the second field.

10. The communication method according to claim 9, wherein information indicating which one of the UC scheme and the NUC scheme is used as the modulation scheme is indicated by 1 bit.

11. The communication method according to claim 9, wherein information indicating which one of the UC scheme and the NUC scheme is used as the modulation scheme is indicated by a plurality of bits in association with the modulation scheme.

12. A communication method, comprising:

receiving a physical (PHY) frame including a preamble and a data field; and processing the received data field, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, the data field includes data that has undergone modulation corresponding to the information indicated in the second field, in the processing of the received data field, the data field is processed based on the information indicated in the second field.

13. The communication method according to claim 12, wherein information indicating which one of the UC scheme and the NUC scheme is used as the modulation scheme is indicated by 1 bit.

14. The communication method according to claim 12, wherein information indicating which one of the UC scheme and the NUC scheme is used as the modulation scheme is indicated by a plurality of bits in association with the modulation scheme.

15. A non-transitory computer readable storage medium that stores a program for causing a computer in a communication device to:

generate a physical (PHY) frame including a preamble and a data field; and transmit the generated PHY frame, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, and the data field includes data that has undergone modulation corresponding to the information indicated in the second field.

16. A non-transitory computer readable storage medium that stores a program for causing a computer in a communication device to:

receive a physical (PHY) frame including a preamble and a data field; and process the received data field, wherein the preamble includes:

a Legacy Short Training Field (L-STF);

a Legacy Long Training Field (L-LTF) arranged immediately after the L-STF;

a Legacy Signal Field (L-SIG) arranged immediately after the L-LTF;

Repeated Legacy Signal Field (RL-SIG) arranged immediately after the L-SIG;

a Short Training Field (STF) arranged after the RL-SIG;

a Long Training Field (LTF) arranged immediately after the STF; and a first Signal Field (SIG) arranged between the RL-SIG and the STF, wherein the first SIG includes a first field indicating information related to Spatial Reuse and a second field in which information indicating which one of a Uniform Constellation (UC) scheme and a Non Uniform Constellation (NUC) scheme is used as a modulation scheme is included, the data field includes data that has undergone modulation corresponding to the information indicated in the second field, the program causes the computer to process the data field, based on the information indicated in the second field.

* * * * *